(12) United States Patent
Rothenberg et al.

(10) Patent No.: US 10,464,392 B2
(45) Date of Patent: Nov. 5, 2019

(54) AIR MIX DUAL-ZONE CONVERTER CAP

(71) Applicants: DENSO International America, Inc., Southfield, MI (US); DENSO CORPORATION, Kariya, Aichi-pref. (JP)

(72) Inventors: Mark Rothenberg, Farmington Hills, MI (US); Raymond Bailey, Northville, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 102 days.

(21) Appl. No.: 15/664,801

(22) Filed: Jul. 31, 2017

(65) Prior Publication Data
US 2019/0030985 A1    Jan. 31, 2019

(51) Int. Cl.
*B60H 1/00*    (2006.01)

(52) U.S. Cl.
CPC ..... *B60H 1/00521* (2013.01); *B60H 1/00028* (2013.01); *B60H 1/00842* (2013.01); *B60H 1/00857* (2013.01); *B60H 1/00864* (2013.01); *B60H 2001/00078* (2013.01)

(58) Field of Classification Search
CPC ...... B60H 1/00064; B60H 2001/00092; B60H 2001/00664; B60H 2001/00707; B60H 2001/00714; B60H 2001/00721; B60H 1/00664; B60H 1/00678
See application file for complete search history.

(56) References Cited

U.S. PATENT DOCUMENTS

| | | | | |
|---|---|---|---|---|
| 4,216,822 A * | 8/1980 | Izumi | ............... | B60H 1/0005 165/42 |
| 5,647,399 A * | 7/1997 | Andersen | ........... | B60H 1/00842 137/637.3 |
| 5,779,535 A * | 7/1998 | Bendell | ............ | B60H 1/00842 137/637.3 |
| 5,921,527 A * | 7/1999 | Ikawa | ............... | B60H 1/00685 251/129.03 |
| 6,007,421 A * | 12/1999 | Schwarz | ............ | B60H 1/00678 137/601.18 |
| 6,419,206 B1 * | 7/2002 | Wakamatu | ......... | B60H 1/00678 251/308 |
| 6,453,991 B1 * | 9/2002 | Tsurushima | ....... | B60H 1/00064 165/202 |
| 6,814,137 B2 * | 11/2004 | Tsurushima | ....... | B60H 1/00064 165/103 |
| 8,555,667 B2 * | 10/2013 | Ozeki | ............... | B60H 1/00857 165/42 |
| 9,566,843 B2 * | 2/2017 | Yamashita | ......... | B60H 1/00678 |

(Continued)

*Primary Examiner* — Travis C Ruby
(74) *Attorney, Agent, or Firm* — Harness, Dickey & Pierce, P.L.C.

(57) ABSTRACT

A heating, ventilation, and air conditioning (HVAC) assembly. The HVAC assembly includes a first shaft and a first airflow door movable by the first shaft. A second shaft and a second airflow door movable by the second shaft are also included. A case houses the first airflow door and the second airflow door. A cap is coupled to both the first shaft and the second shaft outside of the case. Rotation of the cap simultaneously rotates the first shaft and the second shaft.

18 Claims, 2 Drawing Sheets

(56) References Cited

U.S. PATENT DOCUMENTS

| | | | | |
|---|---|---|---|---|
| 2002/0166987 A1* | 11/2002 | Lahier | .............. | B60H 1/00521 |
| | | | | 251/129.15 |
| 2005/0227606 A1* | 10/2005 | Oide | .............. | B60H 1/00692 |
| | | | | 454/108 |
| 2006/0025063 A1* | 2/2006 | Burr | .............. | B60H 1/00664 |
| | | | | 454/69 |
| 2007/0193716 A1* | 8/2007 | Archibald | .......... | B60H 1/00064 |
| | | | | 165/42 |
| 2007/0259614 A1* | 11/2007 | Barnhart | .......... | B60H 1/00842 |
| | | | | 454/121 |
| 2007/0293135 A1* | 12/2007 | Hori | .............. | B60H 1/00678 |
| | | | | 454/121 |
| 2010/0120348 A1* | 5/2010 | Tanaka | .............. | B60H 1/00678 |
| | | | | 454/159 |
| 2011/0162409 A1* | 7/2011 | Okumura | .......... | B60H 1/00842 |
| | | | | 62/498 |
| 2013/0008627 A1 | 1/2013 | Uemura | | |
| 2017/0282681 A1* | 10/2017 | Wagnitz | .......... | B60H 1/00678 |

* cited by examiner

AIR MIX DUAL-ZONE CONVERTER CAP

FIELD

The present disclosure relates to a heating, ventilation, and air conditioning (HVAC) assembly, and specifically to a converter cap for converting a tri-zone HVAC assembly to a dual-zone HVAC assembly.

BACKGROUND

This section provides background information related to the present disclosure, which is not necessarily prior art.

FIG. 1 illustrates a prior art heating, ventilation, and air conditioning (HVAC) assembly at reference numeral 10A. The HVAC assembly 10A is generally configured for use with a vehicle HVAC system. The HVAC assembly 10A includes a case or housing 12, which defines a center or rear zone 20, a first outboard or driver's side zone 22, and a second outboard or passenger's side zone 24. The rear zone 20 is configured to direct airflow to a rear of the vehicle that the HVAC assembly 10A is installed in. The driver's side zone 22 is configured to direct airflow to a front, driver's side of the vehicle. The passenger's side zone 24 is configured to direct airflow to a front, passenger's side of the vehicle. Although the first outboard zone 22 is described as a front, driver's side airflow zone, and the second outboard zone 24 is described as a front, passenger's side airflow zone, one skilled in the art will appreciate that the zones can be reversed such that the first outboard zone 22 is a front, passenger's side airflow zone, and the second outboard zone is a front, driver's side airflow zone.

Arranged at the rear zone 20 is a rear zone airflow door 30, which is movable to control airflow through the rear zone 20. Arranged at the driver's side zone 22 is a first outboard airflow door, or driver's side airflow door 32. The driver's side airflow door 32 is movable to control airflow through the driver's side zone 22. Arranged at the passenger's side zone 24 is a second outboard airflow door, or passenger's side airflow door 34. The passenger's side airflow door 34 is movable to control airflow through the passenger's side zone 24.

Mounted within the case 12 is a first shaft 40, and a second shaft 42. In the example illustrated, the first shaft 40 extends through the second shaft 42. The first shaft 40 extends across the driver's side zone 22 to the rear zone 20, where the first shaft 40 is in cooperation with the rear zone airflow door 30. The first shaft 40 may extend to the passenger's side zone 24, or may terminate prior to reaching the passenger's side zone 24. Rotation of the first shaft 40 by a first servo 50 results in movement of the rear zone airflow door 30 to control airflow through the rear zone 20. The first shaft 40 rotates independent of the second shaft 42. The second shaft 42 is indirectly rotated by a second servo 52. Specifically, the second servo 52 rotates a first gear 60, which rotates a second gear 62. The second gear 62 is coupled to the second shaft 42. The second shaft 42 is in cooperation with the driver's side airflow door 32 such that rotation of the second shaft 42 moves the driver's side airflow door 32 to control airflow through the driver's side zone 22. The case 12 further includes a third shaft 44 arranged at the second outboard zone 24. The third shaft 44 is in cooperation with the passenger's side airflow door 34, such that rotation of the third shaft 44 by any suitable third servo (not shown) moves the passenger side airflow door 34 to control airflow through the passenger's side zone 24. The third shaft 44 rotates independent of each one of the first shaft 40 and the second shaft 42.

The HVAC assembly 10A of FIG. 1 is configured as a tri-zone assembly because each one of the rear zone airflow door 30, the driver's side airflow door 32, and the passenger's side airflow door 34 is independently movable in order to independently control airflow through each one of the rear zone 20, the driver's side zone 22, and the passenger's side zone 24. In some applications it is desirable to convert the HVAC assembly 10A of FIG. 1 from a tri-zone assembly to a dual-zone assembly, such as is illustrated in prior art FIG. 2 at reference numeral 10B.

Prior art FIG. 2 illustrates an HVAC assembly 10B, which is similar to the assembly 10A, but converted to a dual-zone assembly by replacing the first shaft 40 and the second shaft 42 with a fourth shaft 46 and a fifth shaft 48. The fourth shaft 46 is coupled to the fifth shaft 48. The fifth shaft 48 is coupled to the second gear 62. Thus rotation of the first gear 60 by the second servo 52 rotates the second gear 62, and rotation of the second gear 62 rotates both the fourth shaft 46 and the fifth shaft 48 together. The fourth shaft 46 is in cooperation with the rear zone airflow door 30, and the fifth shaft 48 is in cooperation with the driver's side airflow door 32. Because the fourth shaft 46 and the fifth shaft 48 are coupled together and rotate together, the airflow doors 30 and 32 will also move together. As a result, the airflow doors 30 and 32 cannot be controlled independent of one another, and thus airflow through the rear zone 20 and the driver's side zone 22 cannot be independently controlled, as is the case with a dual zone assembly. The third shaft 44 is not coupled to either the fourth shaft 46 or the fifth shaft 48 (although the third shaft 44 may abut the fourth shaft 46 as illustrated), and thus the third shaft 44 remains independently rotatable. As a result, the passenger's side airflow door 34 also remains independently movable to independently control airflow through the passenger's side zone 24.

While the dual zone HVAC assembly 10B of FIG. 2 is suitable for its intended use, it is subject to improvement. For example, the connection between the fourth shaft 46 and the fifth shaft 48 occurs within the case 12, thereby making the HVAC assembly 10B difficult to assemble, and making it difficult to visually confirm that the fourth and fifth shafts 46 and 48 have been properly connected together. An improved dual-zone HVAC assembly would therefore be desirable. Specifically, an improved dual-zone HVAC assembly made from a converted tri-zone HVAC assembly, such as the HVAC assembly 10A of FIG. 1, would be desirable. The present teachings advantageously provide for such an improved dual-zone HVAC assembly having the advantages set forth herein, as well as numerous others as one skilled in the art will appreciate.

SUMMARY

This section provides a general summary of the disclosure, and is not a comprehensive disclosure of its full scope or all of its features.

The present teachings provide for a heating, ventilation, and air conditioning (HVAC) assembly. The HVAC assembly includes a first shaft and a first airflow door movable by the first shaft. A second shaft and a second airflow door movable by the second shaft are also included. A case houses the first airflow door and the second airflow door. A cap is coupled to both the first shaft and the second shaft outside of the case. Rotation of the cap simultaneously rotates the first shaft and the second shaft.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
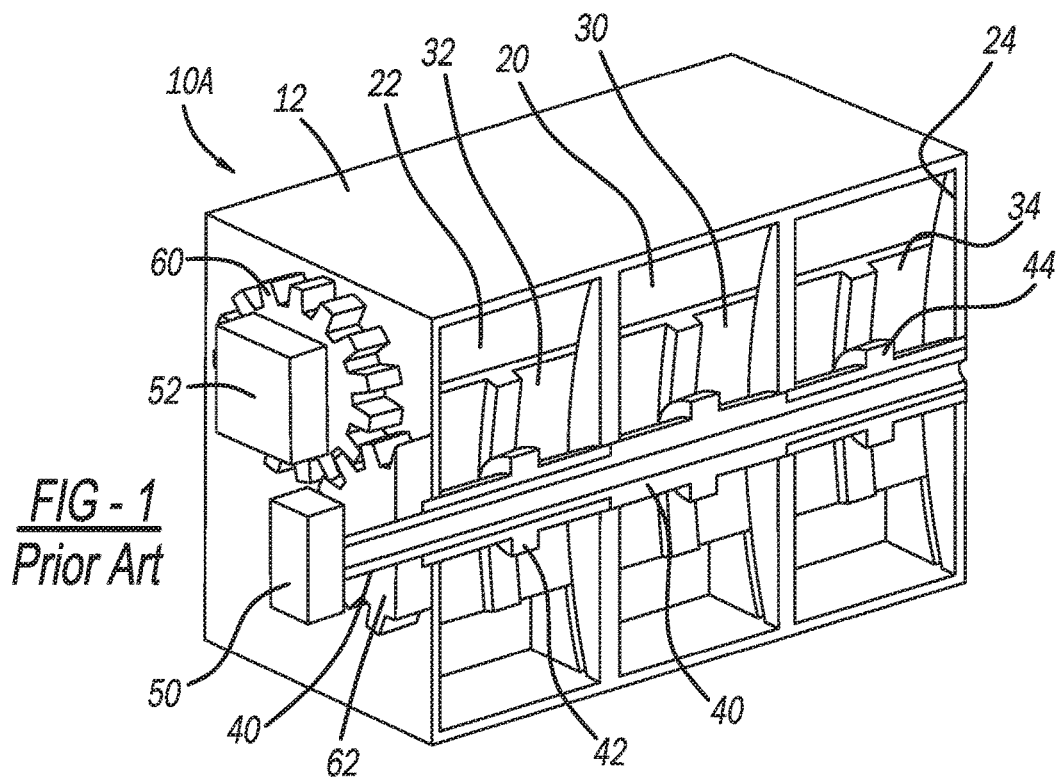
FIG. 1 illustrates a prior art heating, ventilation, and air conditioning (HVAC) assembly configured with tri-zone airflow control.
Figure 2:
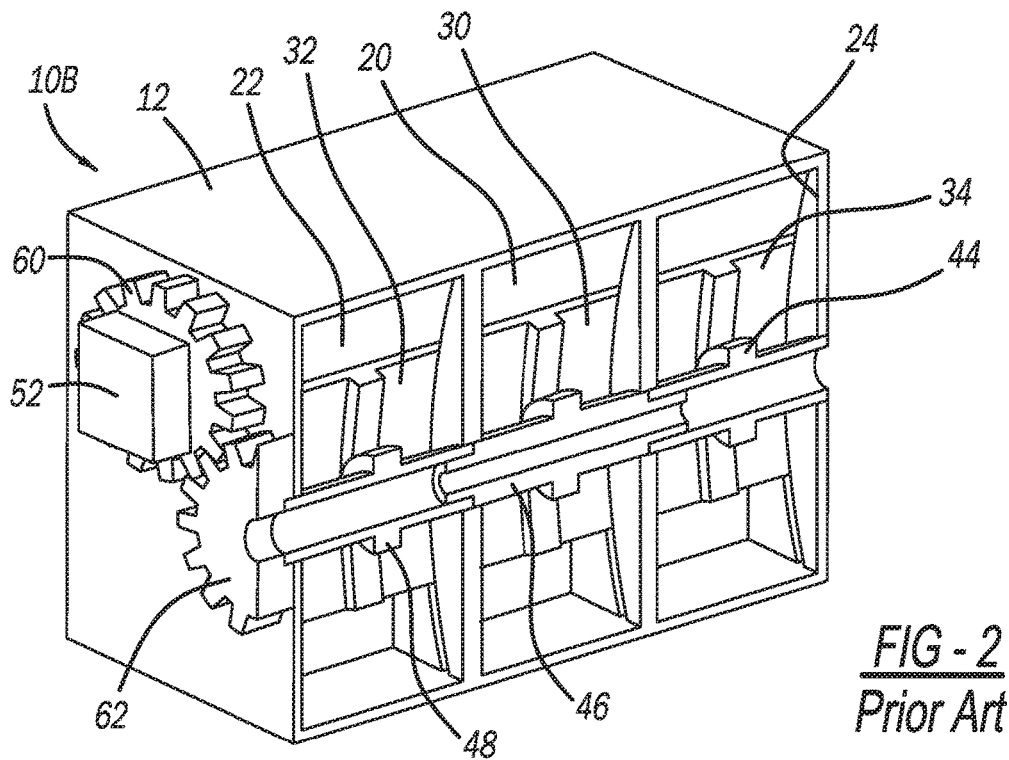
FIG. 2 illustrates another prior art HVAC assembly configured with dual-zone airflow control.
Figure 3:
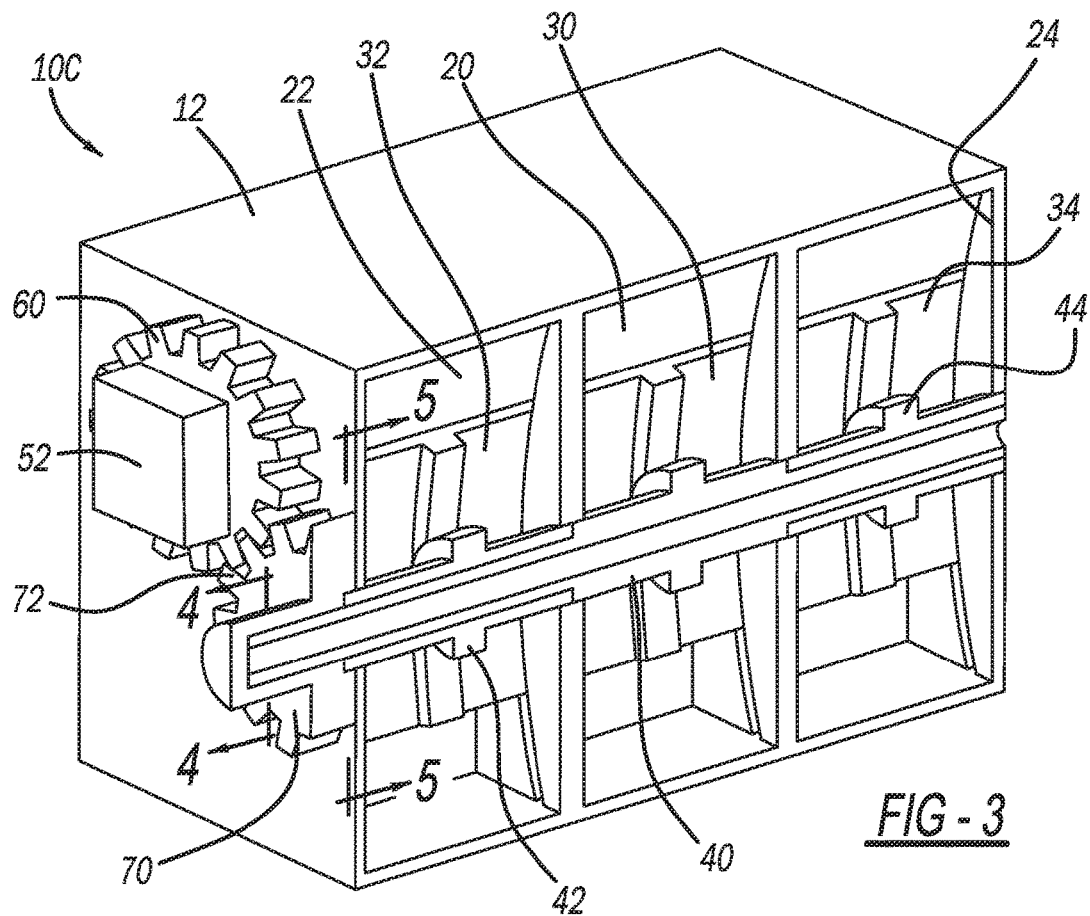
FIG. 3 illustrates an HVAC assembly in accordance with the present teachings configured with dual-zone airflow control.

FIG. 3 illustrates a dual-zone HVAC assembly 10C in accordance with the present teachings. The HVAC assembly 10C includes a number of components in common with the tri-zone HVAC assembly 10A of FIG. 1, and thus the similar components are illustrated with the same reference numerals. The description of the similar components in conjunction with the descriptions of the HVAC assemblies 10A and 10B also applies to the HVAC assembly 10C. The HVAC assembly 10C will be described herein as a vehicle HVAC assembly, such as for a passenger vehicle, mass transit vehicle, military vehicle, construction vehicle/equipment, aircraft, watercraft, etc. However, the HVAC assembly 10C may be used with any suitable non-vehicular applications as well.

The HVAC assembly 10C advantageously includes a cap 70. The cap 70 is coupled to both the first shaft 40 and the second shaft 42 such that rotation of the cap 70 rotates the first and second shafts 40 and 42 simultaneously. Thus the rear zone airflow door 30 and the driver's side airflow door 32 are moved simultaneously to provide the HVAC assembly 10C as a dual-zone assembly. The cap 70 includes a plurality of threads 72, which engage with threads of the first gear 60. Thus rotation of the first gear 60 by the second servo 52 results in rotation of the cap 70. Rotation of the cap 70 simultaneously rotates the first and second shafts 40 and 42, which simultaneously move the airflow doors 30 and 32. The third shaft 44 is independently rotatable, as is the case with the HVAC assemblies 10A and 10B, in order to independently move the passenger's side airflow door 34.

Figure 4:
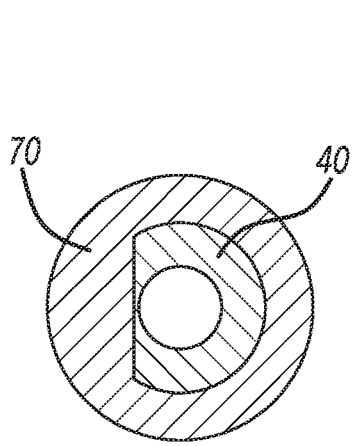
FIG. 4 is a cross-sectional view taken along line 4-4 of FIG. 3.
Figure 5:
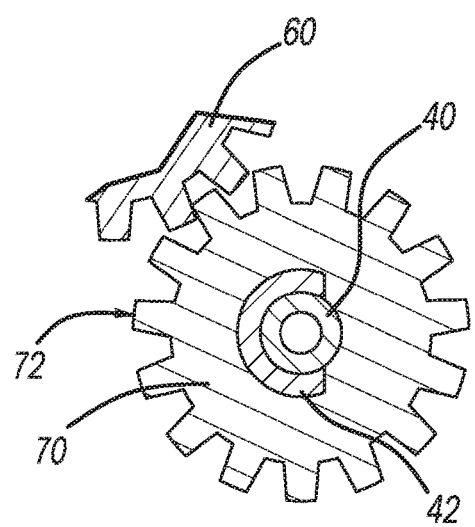
FIG. 5 is a cross-sectional view taken along line 5-5 of FIG. 3.

FIG. 4 illustrates that the cap 70 is keyed to the first shaft 40 so that rotation of the cap 70 will result in rotation of the first shaft 40. FIG. 5 illustrates that the cap 70 is also keyed to the second shaft 42, such that rotation of the cap 70 also results in rotation of the second shaft 42.

As illustrated in FIG. 3, for example, the cap 70 is advantageously coupled to the first shaft 40 and the second shaft 42 at an exterior of the case 12. Thus the tri-zone HVAC assembly 10A of FIG. 1 may be quickly, easily, and cost effectively converted to the dual-zone HVAC assembly 10C of FIGS. 3-5 by removing the first servo 50, and replacing the second gear 62 with the cap 70. Because the cap 70 is connected to the first and second shafts 40 and 42 at an exterior of the case 12, visual confirmation of the connection between the cap 70 and the first and second shafts 40 and 42 can be easily made.

Although the HVAC assemblies 10A, 10B, and 10C are illustrated as including the second outboard zone (or passenger's side zone) 24, the zone 24 is optional and need not be included. Thus without the zone 24, the HVAC assembly 10A would be considered as a dual-zone assembly, and the HVAC assemblies 10B and 10C would be considered as single-zone assemblies.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A heating, ventilation, and air conditioning (HVAC) assembly comprising:
   a first shaft, and a first airflow door movable by the first shaft;
   a second shaft, and a second airflow door movable by the second shaft;
   a case housing the first airflow door and the second airflow door; and
   a cap coupled to both the first shaft and the second shaft outside of the case, the cap defines a receptacle and a recess that are concentrically aligned with each other, the first shaft is received within the receptacle and terminates within the cap, and the second shaft is received within the recess, wherein rotation of the cap simultaneously rotates the first shaft and the second shaft.

2. The HVAC assembly of claim 1, wherein the first shaft extends through the second shaft.

3. The HVAC assembly of claim 1, wherein the cap is keyed to both the first shaft and the second shaft.

4. The HVAC assembly of claim 1, wherein the first shaft and the second shaft are not keyed to each other.

5. The HVAC assembly of claim 1, wherein the cap includes a plurality of teeth for cooperation with a gear such that rotation of the gear rotates the cap.

6. The HVAC assembly of claim 1, wherein both the first shaft and the second shaft extend within the housing, and extend out from within the housing to engage the cap.

7. The HVAC assembly of claim 1, wherein the first airflow door controls airflow to a rear zone of a vehicle.

8. The HVAC assembly of claim 1, wherein the second airflow door controls airflow towards a driver of a vehicle.

9. The HVAC assembly of claim 8, further comprising:
   a third shaft; and
   a third airflow door movable by the third shaft;
   wherein the third airflow door controls airflow towards a passenger of the vehicle.

10. The HVAC assembly of claim 9, wherein the third shaft is movable independent of both the first shaft and the second shaft.

11. The HVAC assembly of claim 9, wherein the first airflow door is arranged in the case between the second airflow door and the third airflow door.

12. A heating, ventilation, and air conditioning (HVAC) assembly for a vehicle, the HVAC assembly comprising:
   a first shaft, and a first airflow door movable by the first shaft, the first airflow door controls airflow to a rear zone of the vehicle;
   a second shaft, and a second airflow door movable by the second shaft, the second airflow door controls airflow to a driver's side zone of the vehicle;
   a third shaft, and a third airflow door movable by the third shaft, the third airflow door controls airflow to a front passenger's side zone of the vehicle;
   a case housing the first airflow door, the second airflow door, and the third airflow door; and
   a cap coupled to both the first shaft and the second shaft outside of the case, the cap defines a receptacle and a recess that are concentrically aligned with each other, the first shaft is received within the receptacle and terminates within the cap, and the second shaft is received within the recess, wherein rotation of the cap simultaneously rotates the first shaft and the second shaft without rotating the third shaft.

13. The HVAC assembly of claim 12, wherein the first shaft extends through the second shaft.

14. The HVAC assembly of claim 12, wherein the cap is keyed to both the first shaft and the second shaft, and the third shaft rotates independent of the first shaft and the second shaft.

15. The HVAC assembly of claim 12, wherein the first shaft and the second shaft are not keyed to each other.

16. The HVAC assembly of claim 12, wherein the cap includes a plurality of teeth for cooperation with a gear such that rotation of the gear rotates the cap.

17. The HVAC assembly of claim 12, wherein both the first shaft and the second shaft extend within the housing, and extend out from within the housing to engage the cap.

18. The HVAC assembly of claim 12, wherein the first airflow door is arranged in the case between the second airflow door and the third airflow door.

* * * * *